Dec. 5, 1944.   E. C. HORTON ET AL   2,364,143
VEHICLE SIGNAL CONTROL UNIT
Original Filed June 14, 1938   2 Sheets-Sheet 1

INVENTORS
Erwin C. Horton
BY  & Anton Rappl,
Beau, Brooks, Buckley & Beau.
ATTORNEYS Dec. 5, 1944.  E. C. HORTON ET AL  2,364,143
VEHICLE SIGNAL CONTROL UNIT
Original Filed June 14, 1938   2 Sheets-Sheet 2
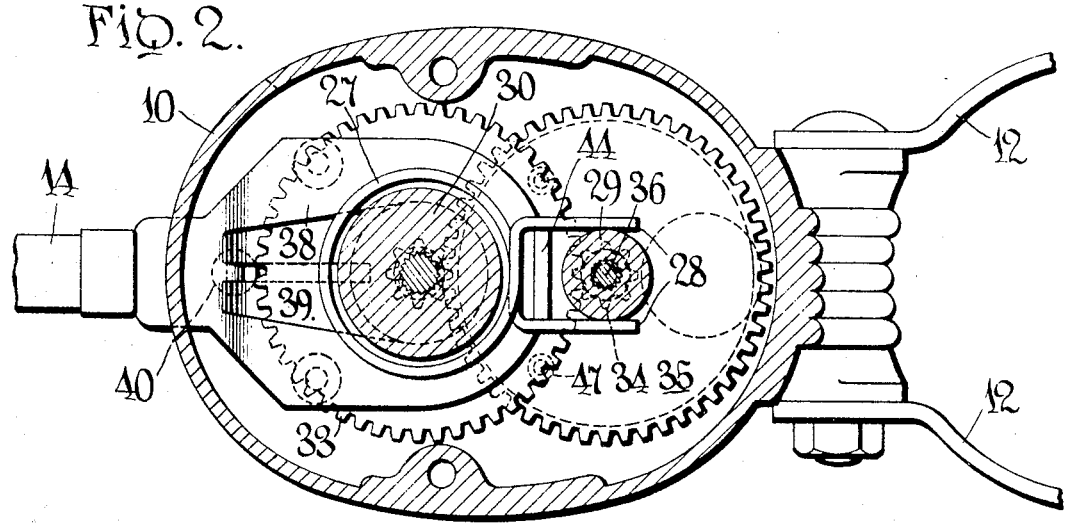
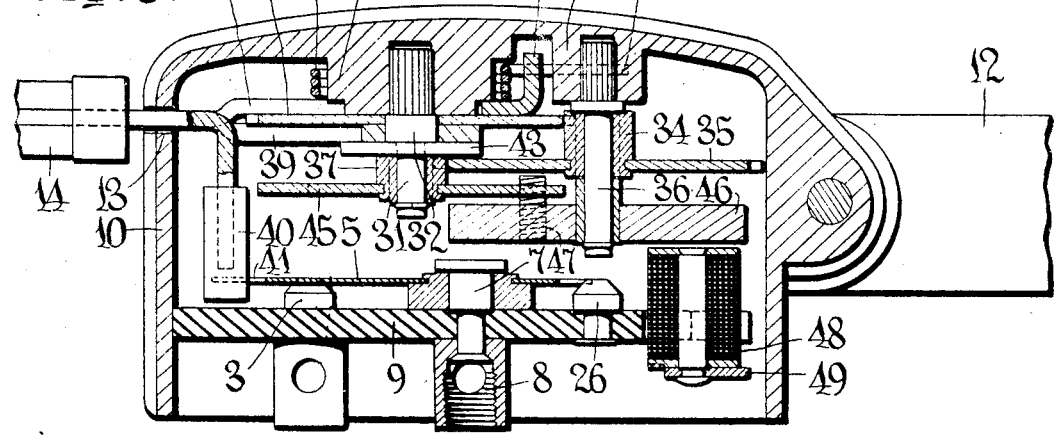
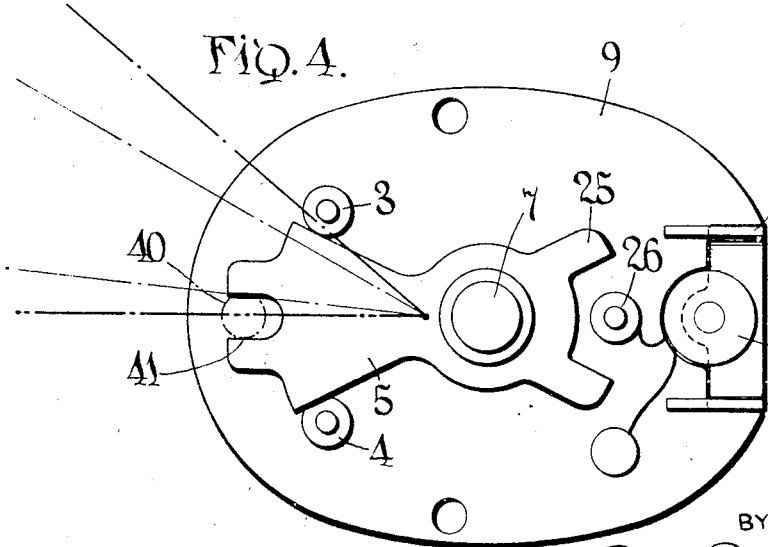
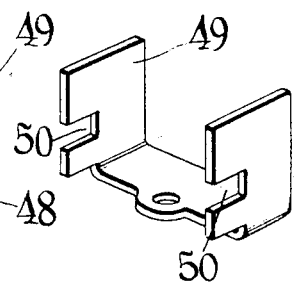
INVENTORS
Erwin C. Horton
BY & Anton Rappl,
Beau, Brooks, Buckley & Beau.
ATTORNEYS Patented Dec. 5, 1944

2,364,143

UNITED STATES PATENT OFFICE 2,364,143

VEHICLE SIGNAL CONTROL UNIT

Erwin C. Horton, Hamburg, and Anton Rappl, Buffalo, N. Y., assignors to Trico Products Corporation, Buffalo, N. Y.

Original application June 14, 1938, Serial No. 213,610. Divided and this application September 10, 1941, Serial No. 410,286

9 Claims. (Cl. 200—33)

This invention relates to a direction indicating system for motor vehicles and the like and it has for its primary object to provide a novel time control release mechanism for clearing the signal after the lapse of a predetermined time interval, the same being a division of our Patent No. 2,300,571 granted November 3, 1942.

The invention further has for its object to provide a signal clearing means in the form of a time delay mechanism in which the mechanism is held arrested through magnetic attraction whereby the construction of the means is simplified and its life of usefulness increased.

Furthermore, the invention involves signal control mechanism of practical design which is efficient in operation.

In the drawings:

Fig. 2 is a horizontal section through the control unit;

Fig. 3 is a vertical sectional view thereof;

Fig. 4 is a plan view of the switch detail forming a part of the control unit;

Fig. 5 is a perspective of the frame of the arresting magnet;

Figure 9:
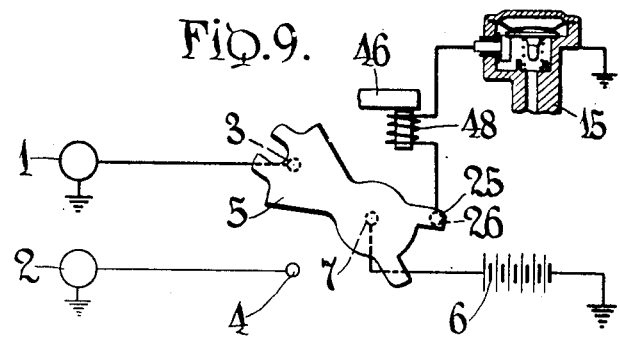
Fig. 9 is a view depicting the electric wiring diagram.

Referring more particularly to the drawings and especially to the wiring diagram depicted in Fig. 9, the numeral 1 designates the left turn signal of a vehicle and 2 the right turn signal, each being electrically connected to contacts 3 and 4, respectively, of a signal setting switch which has an arm 5 movable to selectively bring either signal member into circuit relation with the battery or other source of electric energy 6 from which the circuit is grounded with the selected signal.

Figure 1:
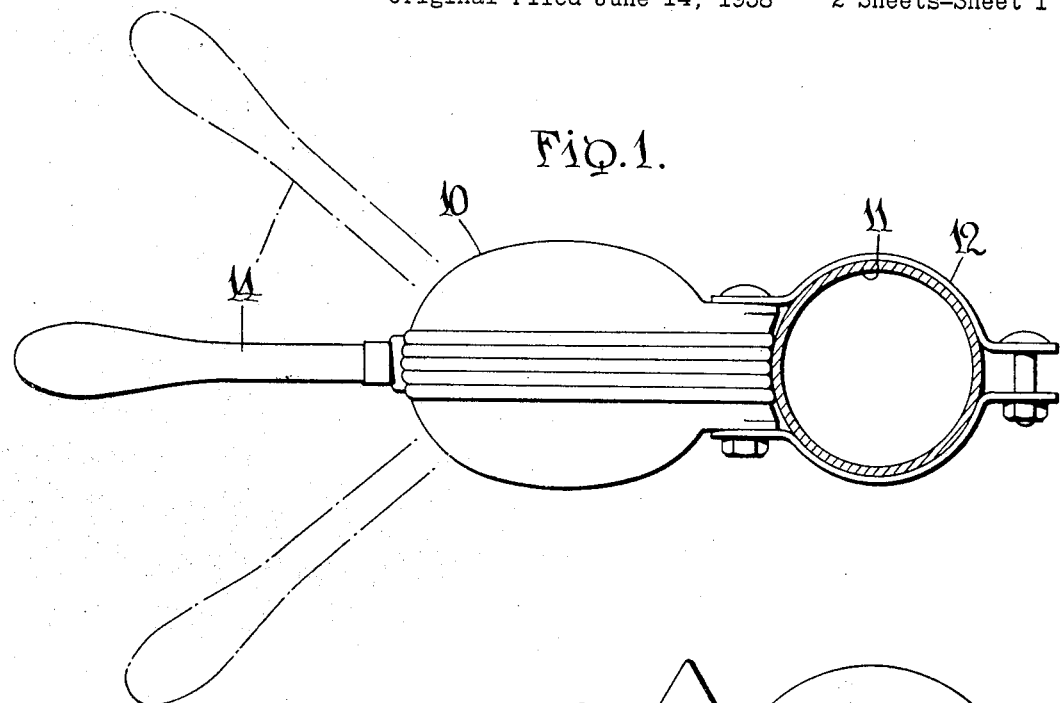
Fig. 1 is a top plan view of the control unit for the signalling system.

From Fig. 3 it will be observed that the switch member 5 is pivotally mounted on a post 7 having a terminal 8 to which the wire from the electric source is connected, such post being mounted on a supporting base 9 of suitable insulating material. This base serves as a floor or closure for a housing 10 which may be mounted on the steering column 11 by a clamp 12 or otherwise disposed in an accessible position. The housing is formed with a slot 13 to receive a hand lever 14 by which the switch member 5 may be moved in opposite directions from a normal position for its selective circuit closing movements. For instance, if it is desired to make a left turn the handle 14 is swung to the left, or upwardly as viewed in Fig. 1, whereupon the contact 3 is brought into circuit closing relation with the battery connected post 7 to energize the signal 1. A reverse movement of the handle from its normal or intermediate position will bring the companion signal 2 into operation.

An automatic switch is provided which is responsive to a varying force, such as the low pressure influence set up in the intake manifold of the motor vehicle engine of the internal combustion type. This automatic switch comprises a body 15 having a chamber 16 connected by a nipple 17 to the intake manifold. The body or casing is preferably metallic for grounding the same with respect to the battery 6. A movable wall in the form of a diaphragm 18 closes one side of the chamber 16 and is responsive to the pressure differential set up by the atmosphere, a protective plate 19 having a vent 19' to the atmosphere. A bridging contact member 20 moves with the diaphragm and is adapted to seat on the shoulders 21 and 22 for closing a retention circuit thereacross, the shoulder 21 forming a part of an insulated terminal connector 23 while the shoulder 22 may be an integral part of the grounded casing 15. The inward movement of the bridging member 20 is against the urge of a spring 24 which serves to hold the same to the diaphragm and moves the bridging member away from the shoulders when the suction influence in the manifold drops, as when tramping the throttle to accelerate the engine.

It is obvious that at times when the suction influence is within predetermined limits, as when the engine throttle is more or less fully closed, the bridging member 20 will be held down in electrical contact with the shoulders 21 and 22. The retention circuit however, will not be completed or fully closed except upon the motorist's cooperating with the automatic switch by manually closing the circuit and this is accomplished herein when the switch member 5 is moved to give a signal, although a separate switch could be employed if desired. The manual switch comprises one or more fingers 25 preferably movable with the member 5 and adapted to engage a contact 26 in electrical connection with the shoulder 21, so that whenever the switch member 5 is moved to close the circuit through a selected signal the retention circuit will also be closed through the contact parts 25 and 26, assuming of course that the bridging member 20 is operatively related to the shoulders 21 and 22, or as soon thereafter as it becomes so operatively related by the motivating force of the power plant or vehicle.

A time lag or delay mechanism, forming the subject matter of the present invention, cooperates with the automatic cut-out or pressure controlled switch for clearing the signal by restoring the switch member 5 to its normal position after the lapse of a predetermined time interval sufficient in extent to permit the normal execution of the signal change. This timing means is energized by and during the operation which renders the signal operative and in the illustrated embodiment includes a spring motor consisting of a coiled power spring 27 having its opposite terminals 28 freely resting against an interposed boss 29 which may be formed integrally with the housing 10. The spring encircles a boss 30 depending from the ceiling of the housing 10, which boss also serves to anchor a shaft 31 having an enlargement 32 for mounting the hand lever 14. A gear 33 is rotatably supported by the shaft 31 and forms a part of a gear train comprising the gears 34 and 35, journaled on a second depending shaft 36 which latter is conveniently fixed in the boss 29, and a second gear 37 on the shaft 31. The hand lever 14 is of unique design and may be stamped from sheet metal to form upper and lower jaws 38 and 39 which straddle and frictionally embrace the driving gear 33, the frictional embrace being sufficient to constitute a driving connection between the gear and the handle while at the same time permitting slippage of the jaws on the gear when quickly moved in either direction therefrom. A lug is turned downwardly from the sheet metal stock of the hand lever and equipped with an insulating sleeve 40 which extends into the slot 41 of the switch member 5 to provide an operative connection between the two. A wear plate 43 is interposed between the lever 14 and the gear 37 to properly dispose the parts, and the upper jaw 38 of the hand lever is formed with a lug 44 upturned between the spring terminals 28 for moving either one while the companion terminal bears against the boss 29. This torsional movement winds the spring for either clockwise or counterclockwise action.

Referring to Fig. 2, if the hand lever is depressed from its normal full line position, the lug 44 will lift upwardly on the superimposed spring terminal 28 and move it counterclockwise, while the underlying spring terminal 28 will be held by the boss 29. Should the hand lever be moved upwardly, the lug 44 will move the underlying spring terminal downwardly in a clockwise direction, while the overlying spring terminal remains stationary against said boss. During this manual swinging movement the hand lever may slide over the gear 33 without moving the same, especially if it is moved quickly, the primary functions of the lever being to wind the spring and throw the switch members 5. When released, the lever will be returned to its normal position by the displaced spring terminal and acting through the lever and its clamping jaws 38 and 39 will impart movement to the train of gears. Such spring driven action will continue until the displaced spring terminal 28 is restored to its normal position against the boss 29, at which time the part 40 will return the switch member 5 to its neutral position. The spring motor may be directly connected to the switch member otherwise than through part 40 although this arrangement simplifies the construction.

The driving action of the spring 27 is controlled to a practical extent by a governor in the form of an escapement comprising a star wheel 45 fixed to the gear 37 and a weighted escapement disk or wheel 46 journaled on the shaft 35 for free oscillation. This weighted disk is provided with a pair of laterally extending pins or pallets 47 in the form of coil springs for quiet operation, the pallets being so arranged as to permit the star wheel to intermittently move under the impetus of the power spring as its teeth cam alternately against the pallets 47 to effect the oscillatory movement of the weighted disk.

For indefinitely retaining the signal operative, means are provided to arrest the time controlled mechanism until such time as will enable the motorist to carry out his indicated change of vehicular travel, and such means is placed under the control of the automatic switch as a part of the retention means. As illustrated, the arresting means embodies an electro-magnet 48 which is interposed in the circuit between the contact shoulder 21 and the switch contact 26 and is so disposed with respect to the weighted disk 46 of the escapement as to magnetically attract and hold the same against movement when the magnet circuit is closed. The magnet has a U-shaped pole piece 49, shown more clearly in Fig. 5, with side notches 50 to fit over the edge of the base piece 9 and thereby position the magnet in proper relation with the disk. The frame or pole piece 49 is held in position by the surrounding housing as well as by pressing the lower sides of the notches into or against the base.

Figure 7:
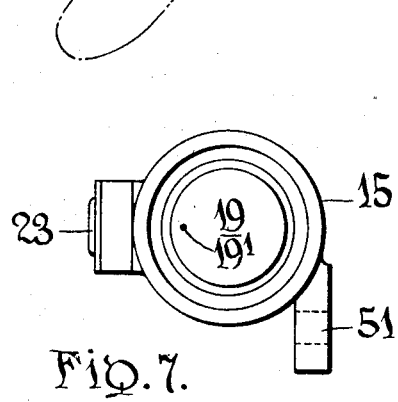
Fig. 7 is a plan view of the automatic cut-out.
Figure 6:
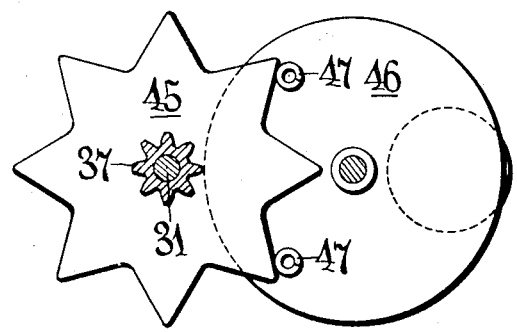
Fig. 6 is a fragmentary illustration of the escapement of the control unit.
Figure 8:
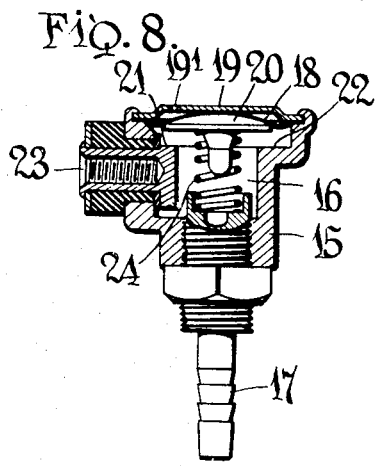
Fig. 8 is a sectional view through the same.

The automatic switch unit, as shown in Figs. 7 and 8, may be mounted by the bracket extension 51 on any suitable part of the chassis to effect the desired ground connection and permit the nipple 15 being connected by suitable tubing, not shown, to the intake manifold.

In operation, the handle 14 is turned right or left depending upon the desired indication to be given. Assuming that a left turn is to be made, the lever 14 is moved to set the switch member 5 in the position indicated in Fig. 9 which closes the circuit through signal 1 and energizes the latter. Concurrently, the finger 25 is engaged with the contact 26 so that if the manifold suction is sufficiently high to render the bridging contact 20 operative, when the suction is sufficiently high to render the automatic switch operative, the retention circuit will immediately close to energize the magnet for holding the time mechanism inoperative. As a rule the manifold suction influence will be sufficient for bringing the bridging contact down on the shoulders 21 and 22 whenever it is desired to give a signalling indication because at such time the motorist is usually slowing down his car, as by closing the engine throttle preliminary to making a turn, and consequently, there will be ample pressure differential to counteract the spring 24. When the handle has been moved to one indicating position and it is desired to change it to the other indicating position, the frictional grip on the driving gear 33 will permit the slippage of the lever thereon without straining or injuring the parts of the spring motor.

Having set the hand lever to operatively dispose the member 5, the magnet becomes effective to hold the escapement against movement, and this retention of the signal will continue until such time as the motorist accelerates his engine by opening the throttle and thereby reducing the pressure differential acting on the diaphragm 18 to such an extent as to permit the spring 24 to function in lifting the bridging contact 20 from the shoulder contacts 21 and 22. If the motorist should release the accelerator pedal again before finger 25 has left the contact 26, the magnet will again become energized to arrest the escapement and hold the signal in its set position. Thus, it is possible for the motorist to momentarily depress his accelerator pedal to continue or increase the motion of his car within certain limits. However, after the lapse of this brief interval the contact finger 25 will ride free of the contact 26 and thereafter the closing of the bridging contact 20 will have no effect on the retention of the signal and the escapement mechanism will operate to restore the hand lever 14 together with the switch member 5 to their normal positions within the prescribed time interval, the switch member riding off its engaged contact 3 or 4 just previous to reaching the normal position. In this connection it should be observed that the contact finger 25 rides free of its contact post 26 prior to the breaking of the signal circuit so that the signal is retained operative for a definite interval subsequent to the release from the holding magnet. This will insure the motorist having ample time to complete the indicated movement.

From the foregoing it will be observed that the signal is set or given through manually controlled means permitting the signal to be pre-set, and that the signal is retained in its set position by the holding means which is responsive to a force set up or developed during vehicle acceleration or other manipulation of the motor vehicle. After the release from said holding means the signal is maintained operative for a substantially definite time interval, as determined by the time controlled mechanism. Obviously the escapement mechanism begins its operation immediately upon release by the electro-magnet and continues to operate until the hand lever and switch member are returned to their normal positions unless again arrested by the magnet preliminary to contact finger 25 riding off the contact post 26.

By reason of the magnet arrest of the escapement, the time delay mechanism is rendered practical since there are no mechanically movable parts in the arresting arrangement, the electro-magnet 48 being disposed along side of the pallet wheel 46. Furthermore, the spring energizing arrangement by which the spring 27 is placed under increased tension or torque facilitates the assembly of the parts within the inverted cup shaped housing 10 so that when the inverted housing is placed over the supporting base 9 the downwardly extending lug 40 will interlock with the switch member 5 and the magnet 48 will be disposed adjacent the pallet wheel 46 with a minimum amount of labor.

It will be understood further that the apparatus and system described and shown herein are merely illustrative of the inventive principles involved, which may be applied to other physical embodiments without departing from the scope and spirit of the invention claimed.

What is claimed is:

1. A control unit having a switch, a manually operable member movable in opposite directions from a neutral position for closing the switch selectively, a spring actuated delayed action mechanism for opening the switch, a friction connection between the member and the mechanism spring for energizing the latter upon either movement of the member to close the switch, said connection constituting a power transmission from the mechanism to said member for opening the switch but permitting independent shifting of the member to make another selection and reenergize the spring, and means for holding the mechanism inoperative after the closing of the switch, said spring being reenergizable by said member unaffected by the functioning of said holding means.

2. A control for motor vehicle indicating systems comprising a housing having a supporting part, a wheel journaled on said part, a hand lever pivoted concentrically with the wheel, a friction clutch operatively connecting the wheel to the lever for operating the latter from the wheel and permitting independent movement of the lever without actuating the wheel, delay mechanism operatively connected to said wheel, a spring coiled about said part and having its terminals extended outwardly therefrom, a second part interposed between the terminals for supporting one terminal when the opposite terminal is displaced to increase the operative tension of the spring, and means carried by the hand lever and selectively engageable with the spring terminals to displace either terminal for energizing the spring motor for operation in a predetermined direction.

3. A control for motor vehicle indicating systems comprising a housing having a supporting part, a wheel journaled on said part, a hand lever mounted coaxially with the wheel and formed of sheet metal to lie flat against the side of the wheel, said sheet metal body having a friction jaw struck out and offset therefrom to bear frictionally upon the opposite side of the wheel whereby the lever may be operated independently of the wheel delay mechanism operatively connected to said wheel, a spring coiled about said part and having its terminals extended outwardly therefrom, a second part interposed between the terminals for supporting one terminal when the opposite terminal is displaced to increase the operative tension of the spring, and a lug carried by the hand lever and extended between the spring terminals for selective engagement with either terminal to energize the motor for movement in either direction.

4. A signal control comprising a support, a lever pivoted thereon and having a spring tensioning part extending laterally therefrom, a spring coiled about the pivotal axis of the lever and having its ends extended laterally on opposite sides of said part for selective engagement thereby to tension the spring for imparting corresponding movement to the lever in restoring it to a neutral position, means operable to anchor the unengaged end of the spring, a wheel concentric with the lever pivot and frictionally embraced by the lever to control the movement of the latter back to its neutral position, the frictional embrace permitting slippage of the lever when manually shifted from one operative position to another, and escapement mechanism operatively connected to the wheel for retarding the controlled movement of the lever.

5. A signal control comprising a support, a lever pivoted thereon and having a spring tensioning part extending laterally therefrom, a spring coiled about the pivotal axis of the lever and having its ends extended laterally on opposite sides of said part for selective engagement thereby to tension the spring for imparting corresponding movement to the lever in restoring it to a neutral position, means operable to anchor the unengaged end of the spring, a wheel concentric with the lever pivot and frictionally embraced by the lever to control the movement of the latter back to its neutral position, the frictional embrace comprising spaced lever parts straddling the wheel and frictionally bearing on the opposite side faces of the latter, and escapement means retarding the spring imparted movement of the wheel.

6. A signal control comprising a support, a lever pivoted thereon and having a spring tensioning part extending laterally therefrom, a spring coiled about the pivotal axis of the lever and having its ends extended laterally on opposite sides of said part for selective engagement thereby to tension the spring for imparting corresponding movement to the lever in restoring it to a neutral position means operable to anchor the unengaged end of the spring, means for retarding the spring imparted restorative movement of the lever including an escapement wheel, and a magnet arranged adjacent the periphery of the wheel to magnetically attract and arrest the same.

7. A delayed action control comprising a support, switch means thereon, an electro-magnet carried by the support, a manual operating member movable to close the switch means, and means for opening the switch means carried by the support and having a part extending within the magnetic field of the electro-magnet to be attractively held thereby when the magnet is energized, said magnet electrically connected to the switch means and adapted to be connected in circuit with means for energizing the same.

8. A time delay control for a motor vehicle signalling system comprising a base, a housing part removably disposed over the base, a time delay mechanism supported by the housing part embodying an escapement with an oscillatory pallet wheel, an electro-magnet carried by the base and disposed to have the pallet wheel within its magnetic field upon energization, but having no mechanical connection therewith whereby the housing part may be removed, and a hand actuated member for setting the time delay mechanism in operation.

9. A time delay control for a direction indicating system having a circuit adapted to be broken, said control comprising a spring motor having an escapement with an oscillatory pallet carrying member, an electro-magnet arranged in such system circuit with the pallet carrying member within its magnetic field for being attractively arrested and thereby hold the motor inoperative, manual means for setting the spring motor in operation and thereby starting the oscillation of the pallet member, and manually controlled switch means operable for energizing the electro-magnet to so hold the motor inoperative.

ERWIN C. HORTON.
ANTON RAPPL.

CERTIFICATE OF CORRECTION.

Patent No. 2,364,143.   December 5, 1944.

ERWIN C. HORTON, ET AL.

It is hereby certified that error appears in the printed specification of the above numbered patent requiring correction as follows: Page 3, second column, line 39, claim 3, after the word "wheel" insert a comma; page 4, first column, line 20, claim 6, after "position" insert a comma; and that the said Letters Patent should be read with this correction therein that the same may conform to the record of the case in the Patent Office.

Signed and sealed this 27th day of March, A. D. 1945.

Leslie Frazer (Seal)   Acting Commissioner of Patents.